United States Patent [19]

Marko et al.

[11] Patent Number: 5,335,360
[45] Date of Patent: Aug. 2, 1994

[54] BASE SITE SELECTION APPARATUS AND METHOD

[75] Inventors: Paul D. Marko, Ft. Lauderdale; Stelios J. Patsiokas, Plantation; Craig P. Wadin, Sunrise; Gary S. Lobel, Boynton Beach, all of Fla.

[73] Assignee: Motorola, Inc., Schaumburg, Ill.

[21] Appl. No.: 720,975

[22] Filed: Jun. 25, 1991

[51] Int. Cl.$^5$ .................. H04B 7/00; H04B 1/06; H04M 11/00
[52] U.S. Cl. .................. 455/56.1; 455/54.2; 455/254; 379/59
[58] Field of Search .................. 455/33.1, 9, 15, 24, 455/34.2, 56.1, 54.2, 254, 33.2; 379/59, 61, 63, 58

[56] References Cited

U.S. PATENT DOCUMENTS

| | | | |
|---|---|---|---|
| 3,986,119 | 10/1976 | Hemmer, Jr. et al. | 325/3 |
| 4,485,486 | 11/1984 | Webb et al. | 455/33 |
| 4,716,407 | 12/1987 | Borras et al. | 340/825.04 |
| 4,783,780 | 11/1988 | Alexis | 370/95 |
| 4,794,635 | 12/1988 | Hess | 379/60 |
| 4,797,948 | 1/1989 | Milliorn et al. | 455/54.2 |
| 4,835,731 | 5/1989 | Nazarenko et al. | 379/63 |
| 4,853,972 | 8/1989 | Ueda et al. | 455/254 |
| 4,866,788 | 9/1989 | Mouley et al. | 455/9 |
| 4,881,271 | 11/1989 | Yamauchi et al. | 455/56 |
| 4,953,198 | 8/1990 | Daly et al. | 379/63 |
| 4,984,290 | 1/1991 | Levine et al. | 455/33 |
| 5,040,205 | 8/1991 | Kunihiro | 379/61 |
| 5,050,234 | 9/1991 | Ohteru | 455/34 |
| 5,119,508 | 6/1992 | Shamasundara | 455/254 |

OTHER PUBLICATIONS

CT2 Common Air Interface Version 1.1, Jun. 30, 1991, "Common air interface specification to be used for the interworking between cordless telephone apparatus in the frequency band 864.1 MHz to 868.1 MHz, including public access services", European Telecommunications Standards Institute, Valbonne Cedex, France.

*Primary Examiner*—Reinhard J. Eisenzopf
*Assistant Examiner*—Lisa Charouel
*Attorney, Agent, or Firm*—Michael J. Buchenhorner; Thomas G. Berry

[57] ABSTRACT

A base site circuit (38) for operating in a communication system (10) having a plurality of base sites capable of allocating a communication channel for use by a communication unit (16) in response to a communication channel request from the communication unit. The base site circuit includes a receiver (34) that operates in a low sensitivity mode when there are no communication channel requests received, and that operates in a high sensitivity mode which is activated by a control signal. The base site further includes a transmitter (34) which is activated by the control signal and a control circuit (32) coupled to both the receiver and the transmitter, for controlling the receiver and the transmitter. The control circuit (32) provides the control signal to the transmitter and to the receiver, in response to a communication channel request.

14 Claims, 1 Drawing Sheet

BASE SITE SELECTION APPARATUS AND METHOD

TECHNICAL FIELD

This invention relates generally to communication systems and more specifically to radio telephone communication systems

BACKGROUND

Radio telephone communication systems (such as second generation cordless telephone, or Digital European Cordless Telephone) comprise a plurality of base sites (also known as telepoints) and a plurality of radio telephones (also known as handsets). Taking second generation cordless telephone (CT2) as an example, the users of the CT2 radio telephones communicate with users of other radio telephones or subscribers in a public switched telephone network (PSTN) via the base sites. A large number of base sites is desirable in certain areas (such as shopping malls) where many persons are likely to place radio telephone calls because that eliminates gaps in coverage by the base site network. However, these base sites are not synchronized with each other. When a radio telephone user wishes to place a call, he or she causes the radio telephone unit to transmit a channel request signal. Since each base site is monitoring the channels of the CT2 system independently, the base site that grants the channel request is not necessarily the one closest to the radio telephone unit transmitting the channel request signal. That may be a problem because the user may move out of range of the base site, thus causing the communication link to be dropped. On the other hand, if the nearest base station had made the channel grant, the radio telephone user would have been able to continue the communication while moving in a greater area. Accordingly, a need exists for a method and apparatus for acquiring a communication channel that overcomes the above problem.

SUMMARY OF THE INVENTION

Briefly, according to the invention, an apparatus is provided whereby a base site scans for a communication channel request at a reduced receiver sensitivity. When the base site detects a valid communication channel request, the base site receiver is activate and a communication link is established between the base site and the communication unit, wherein the base site operates at a high receiver sensitivity.

DETAILED DESCRIPTION OF THE PREFERRED EMBODIMENT

Figure 1:
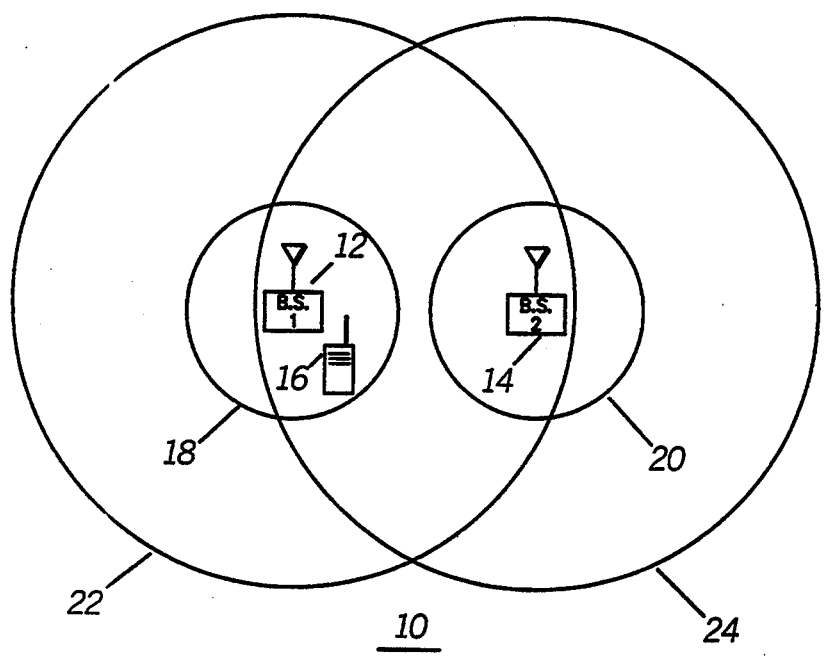
FIG. 1 is a simplified block diagram of a communication system in accordance with the invention.

Referring to FIG. 1, there is shown a simplified block diagram of a portable communication system 10 in accordance with the invention. The communication system (preferably a second generation cordless telephone, or CT2, system) comprises a plurality of base sites (represented by base sites 12 and 14), and at least one portable communication unit 16 (which is preferably, a radio telephone handset). The base site 12 has an operating range represented by area 22, and the base site 14 has an operating range represented by area 24, when they are operating at maximum sensitivity. The base sites 12 and 14 have operating ranges represented by areas 18 and 20, respectively, when operating at a reduced sensitivity mode. In accordance with the invention, the base sites operate in the reduced sensitivity mode while scanning for channel request signals transmitted by portable communication units, and at maximum sensitivity when a channel grant is made establishing a communication link. Thus, in the situation illustrated by FIG. 1, the portable 16 is within the maximum ranges (22 and 24) of both base stations (12 and 14) but will only be granted a communication link by base site 12 because the portable is within the reduced range 18 of base site 12, and not within the reduced range 20 of the base site 14. This avoids the problem of a remote base site, such as base site 14 granting the communication link, and allows maximum communication unit user movement after a channel grant. Thus, it is more difficult to move out of the range of the base site granting the channel.

Figure 2:
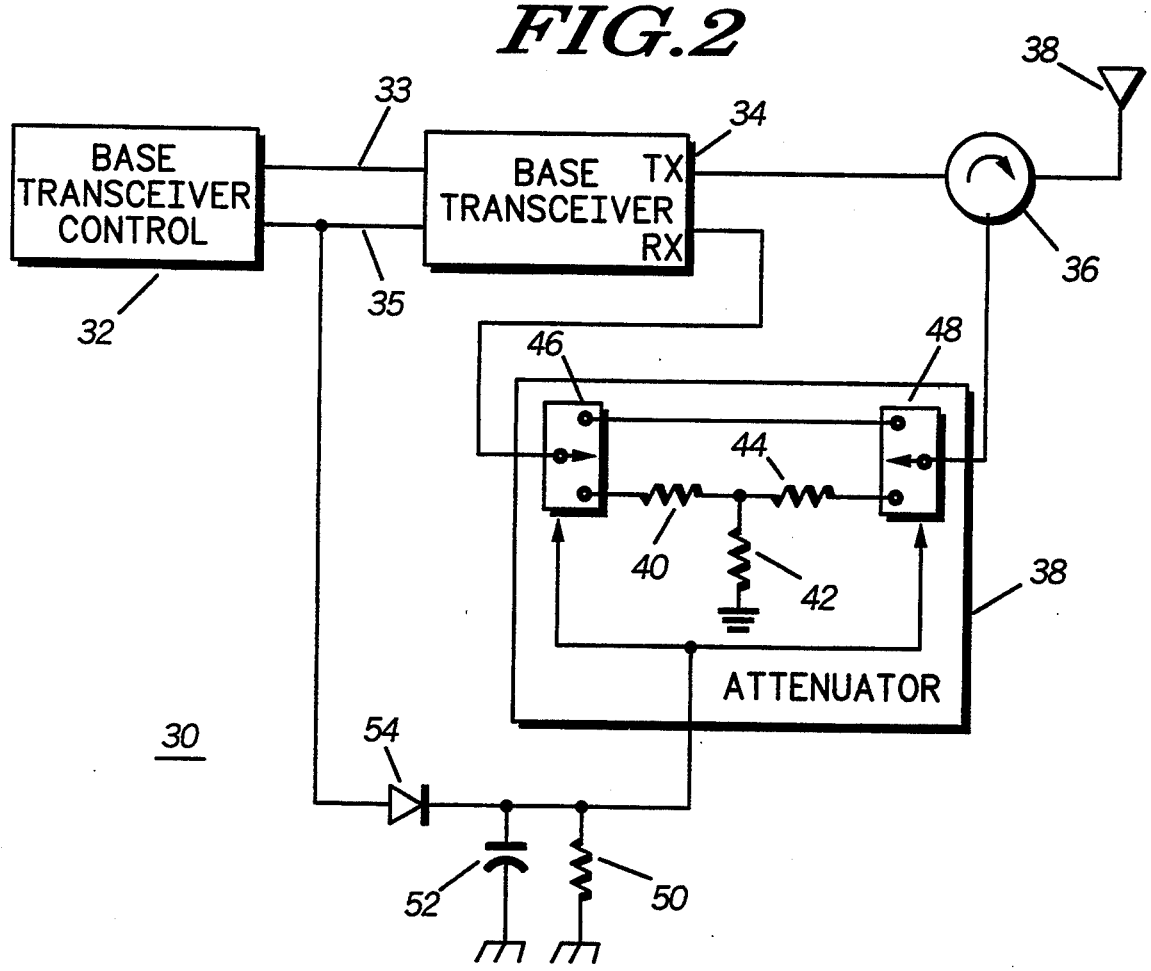
FIG. 2 is a simplified block diagram of a base site in accordance with the invention.

Referring to FIG. 2, a public base site (or wireless phonebooth) 30, in accordance with the invention, is shown in block diagram form. The base site 30 comprises a base receiver control circuit 32, a base transceiver 34, and an RF switched attenuator 38. The base receiver control circuit 32 is coupled to the base transceiver 34 via a receiver control line 33 and a transmitter control line 35. The base transceiver 34 is coupled to the antenna 38 via a circulator or transmit/receive switch 36 to accomplish time-division multiplexing.

The base site scans for channel request signals from portable units periodically in accordance with the TDM scheme used in CT2. The reduced sensitivity mode is accomplished by introducing the switched attenuator 38 in the base site 30. The attenuator 38 is active during the scanning/reduced sensitivity mode. When the switch 36 is in the receive part of its cycle, switches 46 and 48 couple the base receiver input to a resistor network comprising resistors 40, 42, and 44. The values of these resistors are selected to achieve the desired level of attenuation. Thus the signals received at the antenna 38 are attenuated to the desired level so that the receiving range of the base site 30 is accordingly reduced.

The base site transmitter is disabled during the scanning/reduced sensitivity mode. When a valid channel request signal is detected (i.e., after processing by the base transceiver control 32) by the base site 30, the base transceiver control 32 provides a transmitter enable signal, via the line 33, to the transceiver 34. The transmitter enable signal is also applied to the attenuator 38 to disable it, in order to operate at maximum sensitivity. This disablement is accomplished by causing the switches 46 and 48 to couple the base receiver input directly to the switch 36, thus bypassing the attenuating resistor network. The transmitter enable signal is applied to the attenuator through a diode 54 to prevent signals from the attenuator from reaching the base transceiver. A capacitor 52 coupled in parallel with a resistor 50 to filter out RF from the attenuator 38.

Thus, a base site circuit is provided that ensures that channel grants are made only to requesting communication units that are within a predetermined area near the base site to avoid a more distant or otherwise less desirable base site granting the communication channel.

What is claimed is:

1. In a communication system having a plurality of base sites for allocating a communication channel for use by a communication unit in response to a communication channel request from the communication unit, a base site comprising:

receiver means, operating in a low sensitivity mode when there are no communication channel requests received, and operating in a high sensitivity mode, the high sensitivity mode being activated by a control signal;

transmitter means, activated by the control signal; and control means coupled to the receiver means and to the transmitter means for controlling the receiver means and the transmitter means, the control means providing the control signal to the transmitter and to the receiver means, in response to the communication channel request.

2. The base site of claim 1, further comprising:

attenuator means, for attenuating signals received by the receiver means when there are no communication channel requests received, the attenuator means being deactivated in response to the control signal.

3. The base site of claim 2, further comprising antenna means, and wherein the attenuator means comprises:

a resistive network for attenuating signals; and switching means for coupling the resistive network between the receiver means and the antenna means when there are no communication channel requests received, and for directly coupling the receiver means and the antenna means in response to the control signal.

4. In a communication system having a plurality of base sites for allocating a communication channel for use by a communication unit in response to a communication channel request from the communication unit, a method facilitating the use of one of the plurality of base sites comprising the base site steps of:

(a) scanning for the communication channel request at a low receiver sensitivity;

(b) receiving the communication channel request; and (c) allocating the communication channel to the communication unit requesting the communication channel and operating at a high sensitivity mode in response to allocating the communication channel.

5. In a communication system having a plurality of base sites for allocating a communication channel for use by a communication unit in response to a communication channel request from the communication unit, each base site comprising a receiver, a transmitter, an attenuator circuit, an antenna coupled to the receiver and to the transmitter, and a control circuit, for controlling the receiver and the transmitter, the attenuator circuit comprising:

resistor means for attenuating signals; and switching means for coupling the resistor means between the receiver and the antenna when there are no communication channel requests received, and for directly coupling the receiver to the antenna in response to a control signal provided by the control circuit when the communication channel request is received by the base site.

6. The base site of claim 1, wherein the receiver means comprises a scanning receiver for scanning a plurality of communication channels to receive the communication channel request.

7. The base site of claim 6, wherein the scanning receiver means operates to scan the plurality of communication channels in accordance with a time division multiplex protocol to receive the communication channel request.

8. In a communication system having a plurality of base sites for allocating a communication channel for use by a communication unit in response to a communication channel request from the communication unit, wherein at least some of the plurality of base sites include a receiver having a selectable receiving range, a method for operating at least one of the plurality of base sites comprising the steps of:

reducing the receiving range of the receiver;

receiving the communication channel request; and allocating the communication channel to the communication unit requesting the communication channel and increasing the receiving range of the receiver in response receiving the communication channel request.

9. In a communication system having a plurality of base sites for allocating a communication channel for use by a communication unit in response to a communication channel request from the communication unit, wherein at least some of the plurality of base sites comprise:

a receiver for receiving the communication channel request, including receiver range reducing circuitry being selectively active prior to the receiver's reception of the communication channel request; and control circuitry coupled to the receiver range reducing circuitry for deactivating the receiver range reducing circuitry in response receiving the communication channel request.

10. In a communication system having a plurality of base sites for allocating a communication channel for use by a communication unit in response to a communication channel request from the communication unit, wherein at least some of the plurality of base sites include a receiver having a selectable attenuator for attenuating received signals, wherein each of the received signals have a respective received signal level, a method for operating at least one of the plurality of base sites comprising the steps of:

attenuating each of the received signals to be processed by the receiver to a level below their respective received signal levels until the communication channel request is received;

allocating the communication channel to the communication unit requesting the communication channel and operating the receiver to process each of the received signals at their respective received signal levels after receiving the communication channel request.

11. In a communication system having a plurality of base sites for allocating a communication channel for use by a communication unit in response to a communication channel request from the communication unit, wherein at least some of the plurality of base sites include a receiver having a selectable sensitivity, a method for operating at least one of the plurality of base sites comprising the steps of:

reducing the sensitivity of the receiver until the communication channel request is received; and increasing the sensitivity of the receiver in response receiving the communication channel request and communicating with the communication unit requesting the communication channel.

12. In a communication system having a plurality of base sites for allocating a communication channel for use by a communication unit in response to a communication channel request from the communication unit, wherein at least some of the plurality of base sites comprise:

- a receiver for receiving the communication channel request, including receiver sensitivity reducing circuitry being selectively active until the communication channel request is received by the receiver; and
- control circuitry coupled to the receiver sensitivity reducing circuitry for increasing the sensitivity of the receiver in response to receiving the communication channel request.

13. A communication system, comprising:

at least one communication unit for transmitting communication channel requests;

a plurality of base sites, at least one base site comprising:

a transmitter for communicating with the at least one communication unit within an operating range of the at least one base site;

a scanning receiver for scanning communication channels to receive communications from the at least one communication unit within the operating range of the at least one base site, including receiving the communication channel requests; and receiver sensitivity reducing circuitry being selectively active when the scanning receiver is scanning the communication channels to receive the communication channel requests and selectively inactive when the scanning receiver is communicating with the at least one communication unit.

14. A communication system, comprising:

at least one communication unit for operating in accordance with a time division multiplex communication protocol having provision for transmitting communication channel requests;

a plurality of base sites, at least one base site comprising:

a transmitter for operating in accordance with the time division multiplex communication protocol for communicating with the at least one communication unit within an operating range of the at least one base site;

a scanning receiver for operating in accordance with the time division multiplex communication protocol and for scanning communication channels to receive communications from the at least one communication unit within the operating range of the at least one base site, including receiving the communication channel requests; and receiver sensitivity reducing circuitry being selectively active when the scanning receiver is scanning the communication channels to receive the communication channel requests and selectively inactive when the scanning receiver is communicating with the at least one communication unit.

* * * * *